March 19, 1946.  D. G. C. HARE  2,397,072
RADIATION DETECTOR
Filed Jan. 15, 1942  2 Sheets-Sheet 1
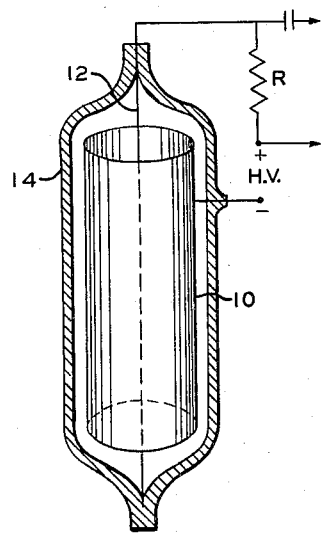
FIG.1.
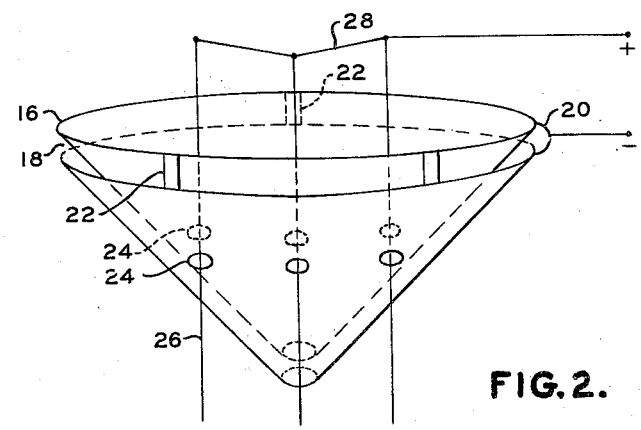
FIG.2.
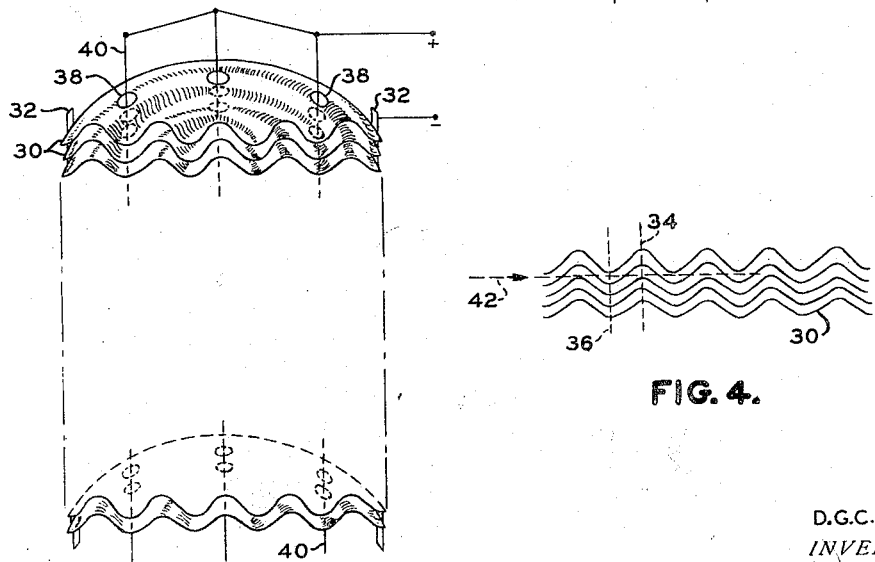
FIG.3.
FIG.4.
D.G.C. HARE
INVENTOR
HIS ATTORNEYS March 19, 1946.  D. G. C. HARE  2,397,072
RADIATION DETECTOR
Filed Jan. 15, 1942  2 Sheets-Sheet 2

Patented Mar. 19, 1946

2,397,072

UNITED STATES PATENT OFFICE 2,397,072

RADIATION DETECTOR

Donald G. C. Hare, New York, N. Y., assignor to Texaco Development Corporation, New York, N. Y., a corporation of Delaware Application January 15, 1942, Serial No. 426,838

11 Claims. (Cl. 250—83.6)

This invention relates to the detecting and measurement of penetrative radiation and more particularly to a device of the Geiger-Muller counter type for measuring the intensity of such radiation as gamma rays.

The principal object of the invention is to provide a device of this type which will have an efficiency much higher than the conventional Geiger-Muller counter and which will be rugged and stable in operation so that it can be used in comparatively rough service, such, for instance, as in the logging of wells or bore holes.

In the copending patent application of myself and another filed November 2, 1940, Serial No. 364,020, there is disclosed a device for the detecting of penetrative radiation, which device has an efficiency many times that of the devices known to the prior art. In accordance with that invention, a number of parallel, separated plates are connected together electrically to form a cathode and a number of fine wires are disposed parallel to and between adjacent plates, these wires being connected together to form the anode of the device. The present invention relates to a device of this general type having the features of high efficiency and stable operation as well as other advantages not necessarily inherent in the device disclosed in that application.

In my copending patent application filed September 27, 1941, Serial No. 412,617, another form of radiation detector is disclosed in which a plurality of parallel, separated plates is provided with holes arranged in alignment, the plates being connected together to form the cathode. A fine wire passes through the center of each series of holes and these wires form the anode of the device. The present invention is an improvement over that disclosed in both of the aforementioned pending applications.

In accordance with the invention a radiation detecting device is formed preferably of a plurality of electrically conducting cathode plates, each of the plates being provided with at least one hole and the holes being aligned so as to allow a fine anode wire to be disposed through the holes. The cathode plates are disposed in a nested or intermeshed relation and are slightly separated. The arrangement of the plates is such that the major portion of each plate is inclined with respect to an imaginary straight line extending through the centers of the plates. By "nested" or "intermeshed relation" is meant that a portion of one plate is disposed within a portion of an adjacent plate without there being physical contact between the plates. In one embodiment of the invention the cathode plates are formed in the shape of cones which are nested together in parallel, separated relation, while in another form of the invention the cathode plates are formed of corrugated discs, the discs being arranged so that the peaks formed by the corrugations will be aligned while at the same time the valleys in the plates will also be aligned. In still another form of the invention the cathode plates are formed of annular rings which are also preferably corrugated for reasons which will be explained hereinafter.

For a better understanding of the invention reference may be had to the accompanying drawings in which:

Figure 1 is a diagrammatic view of a Geiger-Muller counter of the conventional type;

Figure 2 is a somewhat diagrammatic isometric view of one form of the invention in which the cathode plates are conical in shape;

Figure 3 is an isometric view of another form of the invention in which the plates are formed as corrugated discs;

Figure 4 is a diagrammatic view showing a section through some of the plates shown in Figure 3.

Figure 5:
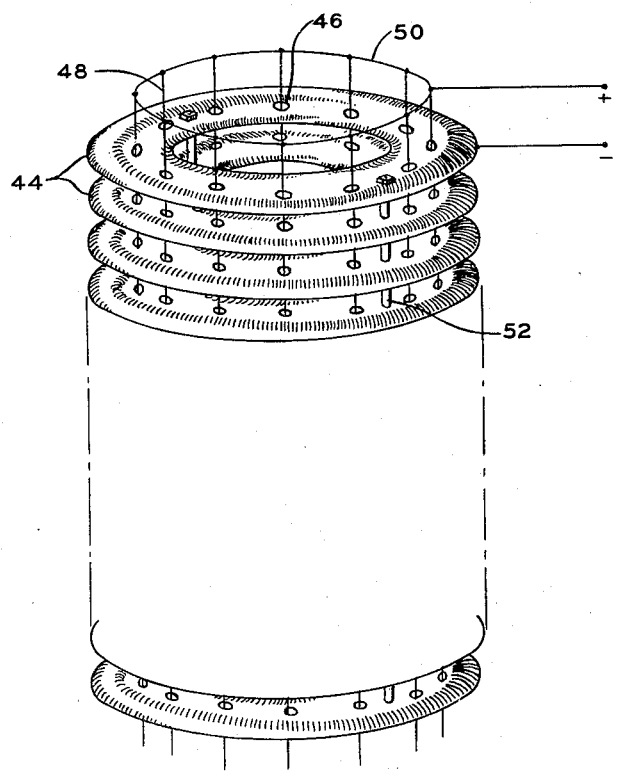
Figure 5 is an isometric view of still another form of the invention in which the cathode plates are formed of annular rings.

The conventional Geiger-Muller counter shown in Figure 1 consists of a thin-walled metal tube 10 with a very thin wire, comprising the anode 12, spanned axially and insulated from the metal tube forming the cathode. These electrodes are enclosed in an envelope 14, commonly a glass tube, which contains a suitable gas, e. g. argon, at a fairly low pressure, say 5–10 cm. of mercury. The central wire 12 is maintained at a positive potential with respect to the cylinder, and a fairly high resistance R is placed in the circuit. Normally the potential difference between the cathode 10 and wire 12 is nearly but not quite high enough to cause a discharge to take place. If a particle capable of ionizing the gas passes through the cylinder 10, a discharge will take place with a current flow of the order of a few microamperes. This causes a large voltage drop across R and the discharge will cease after a very short period of time. By suitably amplifying the sudden voltage drop across R, a mechanical recorder or other device capable of registering the discharge of the counter may be actuated. Suitable treatment of the surface of the cylinder 10 and proper choice of the gas or gases filling the counter will cause the discharge to stop more quickly and reliably. After the discharge has ceased, the counter is again in a condition to register the passage of an ionizing particle.

Because of the large ionization per unit path length of such radiation as cosmic or beta rays, even in the relatively low density of the gas in the counter, the efficiency of the conventional counter for such rays is very nearly 100%. However, the probability of a gamma ray causing ionization in the gas is very small, and practically all the counts due to the passage of gamma rays are due to the electrons ejected from the cathode wall 10 by the interaction of the gamma ray with the atoms of the cathode material. The probability of such an interaction taking place will, of course, increase with increasing cathode-wall thickness, but, since the range in the cathode material of an electron receiving energy from the gamma ray is seldom greater than one- or two-tenths of a millimeter, nothing is to be gained by making the wall 10 thicker than about twice the average range of the particles. At this thickness about one out of every one hundred gamma rays traversing the cathode will eject an electron so as to "trigger" or discharge the counter. This probability or efficiency is somewhat dependent on the material used as the cathode 10 and on the amount of surface exposed, but all these factors will not cause any variation of efficiency by more than a factor of about two from that of a simple counter with the optimum wall thickness.

As has been explained in the preceding paragraph, it is preferable, in a radiation detector for detecting gamma rays for instance, that the plates forming the cathode be thin so that an electron generated by the interaction of a gamma ray and an atom of the plate material can be ejected from the plate into the gas to be ionized. If the cathode plates are thick, there will be a good chance of electrons being generated by gamma rays passing through the plates but when the plates are more than say one mm. in thickness the electrons may not get out of the plates into the surrounding gas. It is therefore desirable that a large number of thin cathode plates be used and that they be disposed, as far as possible, so that any gamma ray entering the detector envelope or housing will pass through one or more of the plates.

With reference to Figure 2 of the drawings, a plurality of thin metallic plates 16 are formed in the shape of cones and these cones are nested together or intermeshed so that surfaces will be parallel while allowing a space 18 between adjacent cones. In Figure 2 only two conical plates have been shown for purposes of simplicity, but it is understood that substantially any number of these plates can be used and connected together electrically, as at 20, to comprise the cathode of the device. The plates may be supported as by means of strips 22 and each of the conical members is provided with at least one, and preferably a plurality of holes 24, the holes in adjacent plates being aligned so as to allow the passage of a wire 26 through each series of holes. The wires 26 are supported in any suitable manner and are connected together electrically, as at 28, to form the anode of the device. It is preferred that each of the holes 24 be elliptical in shape when looking normal to the surface of the cone so that the wire 26 in passing through a series of the holes will be equidistant from the edges of the plates. Although the housing has not been shown in Figure 2, it is intended that the elements as shown in Figure 2 be disposed within any suitable metallic casing or glass envelope, such as is shown in Figure 1, the casing or envelope to be filled with a suitable gas, such as argon, at a predetermined pressure. It will be seen that due to the conical shape of the cathode plates it would be difficult, if not impossible, for a gamma ray to pass into or through the device without penetrating at least one of the plates, and, since the plates are formed of thin material, an electron generated within the plate will be ejected readily therefrom so as to ionize the gas and trip or discharge the detector. The members 16 may be truly conical or, if desired, the apexes may be cut off in which case the members will be frusto-conical in shape.

In Figures 3 and 4 a modified form of a detector is disclosed and in this form the cathode is made up of a plurality of discs 30 disposed in intermeshed, spaced relation and supported by means of suitable strips 32. As is shown perhaps more clearly in Figure 4, each of the plates is formed with annular waves or corrugations, the peaks being in alignment, as shown by the dotted line 34, and the valleys or low portions also being in alignment as shown by dotted line 36. Each of the discs 30 is provided with a plurality of holes 38, the holes in adjacent discs being aligned so that a wire 40 can extend through the center of each series or groups of holes. The discs 30 are connected together electrically as by means of the strips 32 to form the cathode while the wires 40 are also connected together to form the anode of the device. It is preferred that the plates 30 be disposed in such a manner that the low portion of one plate will be lower than the peak of the plate beneath, and, as is shown in Figure 4, it would be substantially impossible for a gamma ray 42 to pass through the plate bank without penetrating one or more of the plates. As was explained with reference to Figure 2, the discs 30 are sufficiently thin to allow electrons to be ejected into the surrounding gas and sufficiently numerous to present a fairly large quantity of metal in the paths of the gamma rays.

Figure 6:
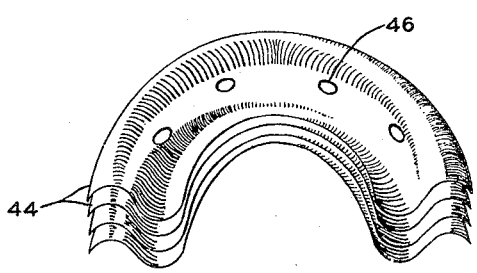
Figure 6 is an isometric sectional view through some of the plates or rings shown in Figure 5.

In Figures 5 and 6 another modification is shown in which the cathode plates are formed as annular rings 44, each of these rings being annularly corrugated, as shown in Figures 6, and the plates being arranged so that a gamma ray cannot pass through the bank of plates without penetrating one or more of the plates. Each of the rings is provided with a plurality of holes 46 arranged in alignment so that wires 48 can be disposed through the centers of each series or groups of holes, these wires being connected together, as at 50, to form the anode of the device and the cathode plates being connected together, as by bolts or rods 52, to form the cathode of the device. By forming the plates or rings in the corrugated shape shown, the thin metal members are materially strengthened and, as previously stated, with this arrangement a gamma ray would have to penetrate one or more of the rings in passing there-through. As has been mentioned with reference to Figure 2, the housing or envelope for the device shown in Figure 3 has been omitted for purposes of clarity and it should be understood that any suitable container can be provided.

The modification shown in Figures 5 and 6 is admirably suited to certain purposes where it is desired to have access to the inner portion of the device. Thus, the housing or envelope for the device shown in Figure 5 could be annular in shape thus providing a central opening through the entire bank of plates. A core sample could be placed within this opening so as to determine the amount of radiation in the sample or a quantity of fluid could be caused to flow through the central opening, the device then serving to detect the amount of radiation from the fluid.

Obviously many modifications and variations of the invention, as hereinbefore set forth, may be made without departing from the spirit and scope thereof, but only such limitations should be imposed as are indicated in the appended claims.

I claim:

1. A radiation detecting device comprising a plurality of plates disposed in separated, substantially parallel relation about a center axis, the major portion of each plate being inclined with respect to said axis and the inclined portions of adjacent plates crossing a plane disposed at right angles to said center axis, said plates being connected together to form a cathode, each of said plates being provided with at least one hole with the holes in the plates disposed in alignment, and an anode member comprising a wire extending through said aligned holes.

2. A radiation detecting device comprising a plurality of thin metallic members disposed in spaced, intermeshed relation about a center axis, said members being connected together to form a cathode, each of said members being provided with holes, the holes in the plates being disposed in a plurality of aligned groups, and an anode member comprising a wire extending through each group of holes.

3. A radiation detecting device comprising a plurality of plates disposed in separated, substantially parallel, intermeshed relation about a center axis, the major portion of each plate being inclined with respect to said center axis, said plates being connected together to form a cathode, each of said plates being provided with a plurality of holes and the holes in the plates being disposed in aligned groups, and an anode member comprising a wire extending through each of said groups of holes.

4. A radiation detector comprising a plurality of metallic, cone shaped, plate members, means for supporting said members in a separated, intermeshed relation about a center axis, each of said members being provided with a plurality of openings and with the openings in the several members disposed in aligned groups, and a wire extending through each group of aligned holes, said plate members being connected together electrically to form the cathode of the detector and the wires being connected together to form the anode.

5. A gamma radiation detector comprising a plurality of metallic plate members formed substantially in the shape of cones, means for supporting said members in a nested, separated relation about a center axis, said members being provided with a plurality of groups of aligned openings, and a wire extending through each group of aligned holes, said plate members being connected together electrically to form the cathode of the detector and the wires being connected together to form the anode.

6. A radiation detector comprising a plurality of metallic, substantially cone shaped, plate members, means for supporting said members in a separated, intermeshed relation in a nested bank about a center axis, each of said members being provided with a plurality of openings and the openings in the several members being disposed in aligned groups, and a wire extending through each group of aligned holes, said wires being substantially parallel to said center axis, said plate members being connected together electrically to form the cathode of the detector and the wires being connected together to form the anode.

7. A device for detecting radiation comprising a plurality of annularly corrugated metallic discs disposed in separated, intermeshed relation about a center axis, each of said discs being provided with a plurality of openings and the openings in the discs being disposed in aligned groups, an anode wire extending through each group of openings and the discs being connected together electrically to form the cathode of the device.

8. A device for detecting gamma radiation comprising a plurality of annularly corrugated metallic plates disposed in separated, intermeshed relation about a center axis, the inclined portions of adjacent plates crossing a plane disposed perpendicularly to said center axis, each of said discs being provided with a plurality of openings and the openings in the discs being disposed in aligned groups, a wire extending through each group of openings, the discs being connected together electrically to form the cathode of the device and the wires being connected together to form the anode.

9. A radiation detector comprising a plurality of thin, metallic, annularly corrugated rings connected together electrically to form a cathode, said rings being disposed in a separated, intermeshed relation and each ring being provided with a plurality of openings and the openings in the rings being disposed in aligned groups, and a wire extending through each group of openings, said wires being connected together electrically to form an anode.

10. A gamma radiation detector comprising a bank of thin, metallic, annularly corrugated rings connected together electrically to form a cathode, said rings being disposed in a separated, intermeshed relation about a center axis and the inclined portions of adjacent rings crossing a plane disposed at right angles to said center axis, and each ring being provided with a plurality of openings, the openings in the bank of rings being disposed in aligned groups, and a wire extending through each group of openings, said wires being connected together electrically to form an anode.

11. A radiation detector comprising a plurality of thin metallic ring members spaced uniformly apart in a longitudinal bank and connected together electrically to form a cathode, each member being provided with a plurality of openings and the openings in the members being disposed in aligned groups, and an anode wire extending through the center of each group of openings.

DONALD G. C. HARE.